United States Patent [19]

Riederer et al.

[11] 4,399,457

[45] Aug. 16, 1983

[54] X-RAY IMAGE DIGITAL SUBTRACTION SYSTEM

[75] Inventors: Stephen J. Riederer, Wauwatosa; Gary S. Keyes, Hartland; Barry N. Stone, Waukesha, all of Wis.

[73] Assignee: General Electric Company, Schenectady, N.Y.

[21] Appl. No.: 271,291

[22] Filed: Jun. 8, 1981

[51] Int. Cl.³ .............................................. H04N 7/18
[52] U.S. Cl. .................................... 358/111; 364/414; 364/722; 378/99
[58] Field of Search ................ 358/111; 364/414, 722; 378/99

[56] References Cited

U.S. PATENT DOCUMENTS

| | | | |
|---|---|---|---|
| 4,172,286 | 10/1979 | Wess | 364/722 |
| 4,204,225 | 5/1980 | Mistretta | 358/111 |
| 4,204,226 | 5/1980 | Mistretta | 358/111 |
| 4,233,662 | 11/1980 | Le May | 364/414 |
| 4,323,973 | 4/1982 | Greenfield | 358/111 |
| 4,367,490 | 1/1983 | Riederer | 378/99 |

*Primary Examiner*—Howard Britton
*Attorney, Agent, or Firm*—Wheeler, House, Fuller & Hohenfeldt

[57] ABSTRACT

In a digital fluoroscopy system, analog video signals representative of successive x-ray image frames are converted to digital pixel values that are used as addresses, respectively. A digital memory stores at its respective locations a digital value corresponding to the logarithm of an address value so that when a digital pixel value represented by an address is fed from the analog-to-digital converter to the memory the memory will output the logarithm of the pixel value in digital form. Pixel values for successive x-ray images are subtracted in-phase on a pixel-by-pixel basis to produce digital difference pixel signals which are converted to analog video signals for driving a television monitor that displays an image representative of the difference between x-ray images.

6 Claims, 2 Drawing Figures

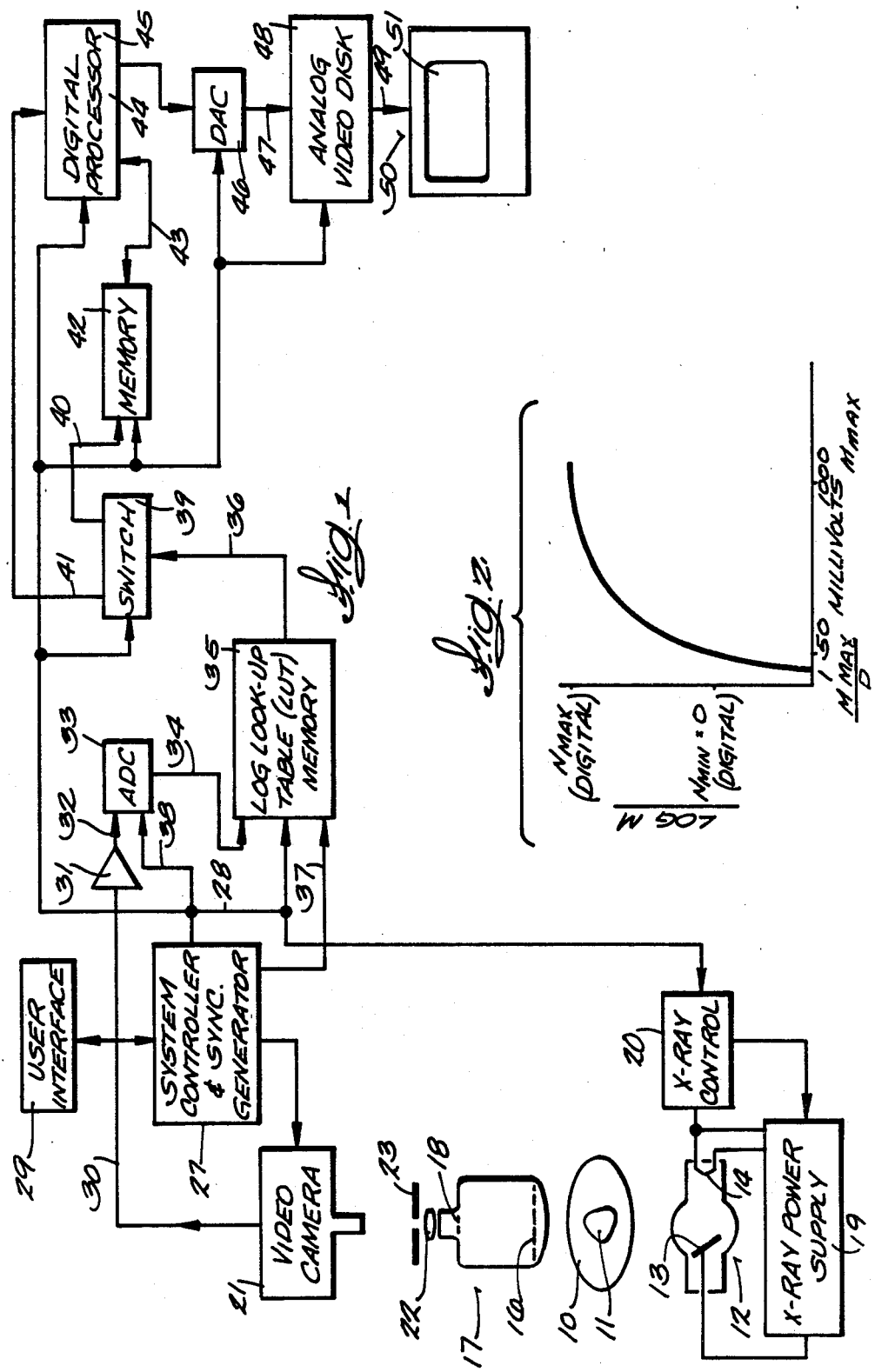

X-RAY IMAGE DIGITAL SUBTRACTION SYSTEM

BACKGROUND OF THE INVENTION

This invention relates to subtraction fluoroscopy systems. In particular, the invention is an improvement in performing logarithmic compression of video signals in such systems.

In single x-ray images of an anatomical region, bone, blood vessels or other tissue of primary diagnostic interest may be surrounded or overlayed or underlayed by tissue or bone which obscures and prevents visualization of the fine structure of interest. Subtraction of two images of the same region is performed to remove or suppress the potentially confusing effects of uninteresting overlaying and underlying structures to thereby enhance the detectability and display of the structure of interest.

An important use of the image subtraction process is making angiographic examinations, that is, making x-ray examinations of blood vessels, typically the arteries of the heart or other organ. In this technic, a fluoroscopic x-ray image of the heart or other organ is made and converted to corresponding digital picture element (pixel) values. Shortly after one image is made, an x-ray opaque medium, such as an iodine compound, that has been injected into the blood vessels reaches the heart blood vessels and then another x-ray image is made and converted to digital pixel values. When one of the images is subtracted from the other, digital difference pixel signals result. The difference signals are amplified and converted to analog video signals which are fed to a television monitor that displays the difference image. In the difference image, some anatomical structures are deemphasized and a higher contrast and more easily visualized image of the iodine-infused vessels remains.

Methods and apparatus for performing digital x-ray image subtraction are described in U.S. Pat. Nos. 4,204,225 and 4,204,226. The systems shown in these patents produce the successive images for subtraction with a relatively broad spectrum x-ray beam. The x-ray images are converted to optical images with an x-ray image intensifier. The optical images are received by a video camera that converts them to an electrical video signal. This signal is suitably processed and subjected to analog logarithmic amplification before being converted to a series of digital words.

Because attenuation of the x-ray beams by the body is an exponential function of the product of the coefficient of absorption and the thickness of the anatomy in the beam, there is a non-linear relationship between the analog video signals and the corresponding tissue thicknesses. Hence, in digital image subtraction systems, it is desirable to subject the video signals in either analog or digital form to logarithmic amplification. As indicated earlier, an analog logarithmic amplifier can be used before digitization. It has been observed, however, that even if the most fully compensated, broadest bandwidth and highest grade analog logarithmic amplifiers are used, conversion accuracy is not as good as it could be for digital fluoroscopy or image subtraction purposes. Since the input signal is an exponential function of the product of the coefficient of absorption and thickness of the anatomy, if accurate logarithmic transformation occurred, the output signal of the amplifier should be very linear and consistent with a true exponentially decaying input. Even with the highest grade fully compensated analog logarithmic amplifier, the function may not be truly logarithmic and is subject to drift of both the log curve and the dc offset. Wide dynamic range and wide band log amplifiers are very difficult to design or procure. Slight departures from perfect log conformity may be tolerable for difference imaging on a qualitative basis, but it is not acceptable where quantitative digital fluoroscopic work is intended. For quantitative work, accurate logarithms of video picture element signals which do not drift during a patient study are required.

Another problem with analog logarithmic amplifiers is limited bandwith. As dynamic rangge increases, smaller signals are used. Because the gain applied to such signals is large, the bandwidth suffers. Hence, a serious disadvantage of video frequency analog logarithmic amplifiers, particularly at large dynamic range, is limited bandwidth.

Another prior art approach is to perform a logarithmic transformation after the video signals have been digitized. A microprocessor or computer may be used to make the transformations. Considering that the digitized video signal frequency is commonly around 12 MHz, the computer would have to make 12 million conversions per second in order for the system to operate in and display difference images in real-time. It has been found that the times for software to transform digital pixel signals to logarithmic equivalents are on the order of one microsecond or more per pixel. So even with the fastest microcomputer and software, conversion has been found to be too slow by a factor of about 10. Slowness results from the fact that an algorithm must be used which re-expresses the logarithm as a power series of additions and multiplications.

SUMMARY OF THE INVENTION

An object of the present invention is to provide for logarithmic transformation of video signals in a digital fluoroscopy system which overcomes the bandwidth, noise, speed and accuracy limitations of the prior art logarithmic conversion methods.

In accordance with a preferred embodiment of the invention, look-up tables are used for logarithmic conversion. Conversion is performed after the analog video signals are digitized. The digitized pixel signals are addresses to locations in a look-up table which is implemented with a programmable read-only memory (PROM) or a random-access memory (RAM). In other words, a logarithmic transformation function is stored in the chosen memory. The digital output signal from the memory for each pixel is a scaled and suitably offset logarithm of the input pixel signal. Thus, a true logarithmic relationship between input and output signals is predetermined.

Before describing a preferred embodiment of the invention some conditions will be defined. One is that most but not all of the video signal representative of the respective x-ray images will be used. More specifically, that part of the video signal corresponding to true black level and part of the signal somewhat whiter than true black level will not be used but the major part of the signal up to the whitest level will be used. True black corresponds to no x-ray transmission through the anatomy and results in zero video signal whereas true white corresponds to maximum x-ray transmission and maximum video signal. The ratio of the maximum available video signal to the minimum signal value selected defines the full dynamic range of the video signals. For example, if the most intense part of the x-ray beam detected resulted in a peak video signal of 1000 mv and the noise level of the video camera were 1 mv, the dynamic range of the camera would be 1000. In x-ray images, the whitest region in the image will typically be 10 to 30 times as bright as the darkest region which is tantamount to saying the dynamic range of the image itself will typically be, or can be controlled to be, between 10:1 to 30:1. In terms of signal, dynamic range is defined as the ratio of the peak signal to the minimum signal of interest. If, as in the example to be described herein, a dynamic range, D, of 20 is selected one would go down from 1000 mv to 1000/20 or 50 mv. Any video signal below 50 mv would not be used.

There are several reasons for not using signals below a certain level. One is that the darkest parts of the image correspond to fewer x-ray photons penetrating the anatomy in those parts in which case the signal-to-noise ratio is low so little information can be derived from those parts. Hence nothing of value is lost if the low signals are not used.

Another reason is that the dynamic range can be limited to produce the advantage of not requiring an unduly large bit range of the digitized video signals. For example, usually the anatomical region of interest will have fairly constant thickness or density distribution. In almost any case, the x-ray beam can be collimated or coned down so that there will not be drastic differences in intensity levels over the image and so the darkest and thickest anatomy parts of the image are roughly a factor of 15 or 20 less bright than the brightest parts of the image which correspond to the thinner parts of the anatomical region in the x-ray beam. So it is reasonable to use a dynamic range of about 20 for illustrative purposes.

An illustration of how the new logarithmic transformation apparatus and method can be employed in a typical digital fluoroscopy system will now be discussed in greater detail in reference to the drawings.

DESCRIPTION OF THE DRAWINGS

FIG. 1 is a block diagram of a digital fluoroscopy system in which the invention is employed; and, FIG. 2 is a plot of the video input signals versus their logarithm (log) and digital equivalents.

DESCRIPTION OF A PREFERRED EMBODIMENT

In FIG. 1, a body being examined is represented by the ellipse marked 10 and anatomy of particular interest, such as the heart, is marked 11. During examination, the body is disposed over an x-ray tube 12 which is conventional in that it comprises an anode target 13 and a cathode or filament 14. When the x-ray tube is energized, its beam is projected through the body 10 to form a differentially attenuated x-ray image on the input screen 16 of an electronic x-ray image intensifier that is generally designated by the numeral 17. Intensifier 17 is conventional in that it is operative to convert an x-ray image to an electron image which is ultimately converted to a bright minified optical image on an output phosphor which is indicated by the dashed line marked 18.

The x-ray tube power supply is represented by the block marked 19. It is understood to provide high kilovoltage between anode 13 and cathode 14 for making an x-ray exposure as governed by a conventional x-ray control system 20. Current flow in the x-ray tube is determined by filament current and voltage across the tube. Two modes of operation will be discussed. One is a continuous temporal subtraction or mask mode wherein an x-ray image is made of the organ having the blood vessels of interest and the data representative of this mask image is stored in memory. Subsequently, when an x-ray opaque medium, such as an iodine compound, which has been introduced into the blood vessels reaches the organ of interest, a series of images is made and subtracted successively from the mask to allow display of the difference images which reveal flow of the blood through the vessels. The difference images can be generated at television frame rates so as to yield a continuous or real-time display.

The other is a serial or snapshot temporal subtraction mode wherein a mask image is produced before the blood that entrains the x-ray opaque medium reaches the vessels of interest. Then x-ray exposures and, hence, corresponding images are made at operator selected image rates such as one per second, for instance, and subtracted from the mask to permit display of a new difference or subtraction image at one second intervals. The snapshot mode minimizes x-ray dosage since the x-ray source is turned on periodically whereas, in the temporal mode it is likely to be on continuously. The snapshot or serial mode is used most frequently where conditions are changing slowly.

In FIG. 1, the bright optical image appearing on phosphor 18 is collimated with an objective lens 22 which is on the optical axis of the lens of a video camera 21. There is an aperture symbolized by the perforated line marked 23 disposed in the optical beam path. The aperture matches the peak brightness output of the image intensifier to the maximum useful signal of the video camera.

X-ray exposure and image readout, that is, electron beam scanning of the image pick-up tube plate in the video camera 21 and other operations in the system must be synchronized and timed as is readily apparent. Synchronizing pulses are obtained from the system controller which is represented by a block marked 27. The controller provides all timing and control signals to the system by way of a bus 28. A user interface represented by the block marked 29 provides the user with certain controls over the system and may be entered by the use of a keyboard, not shown.

When the x-ray tube is turned on, the electron image formed on the image target of the video camera is read out or scanned and the output of the camera, appearing on cable 30, is a succession of lines of analog video signal waveforms corresponding to the picture elements in each horizontal video image line.

The analog video signals representative of the x-ray images are fed by way of cable 30 to a buffer amplifier 31 whose output is coupled by way of a line 32 to analog-to-digital converter (ADC) symbolized by the block marked 33 which will be discussed later. As indicated earlier, in some prior art systems logarithmic compression of the analog signals is performed by an analog logarithmic amplifier that is usually located where buffer amplifier 31 is located. In accordance with the present invention, logarithmic compression or transformation to log values is done after digitization.

The amplitude range of the video signal input to amplifier 31 may be considered to be, for illustrative purposes, in the range of zero millivolts (mv) for black level and 650 mv for the brightest picture elements. Since x-ray image signals near the black level have poor signal-to-noise ratio and do not provide any useful diagnostic information, such signals are eliminated in the system disclosed herein. Only signals somewhat above true black level are used. As will be evident later, for the purpose of logarithmic conversion in accordance with the invention, signals below 50 mv are not used and a range of pixel signals between 50 mv and 1000 mv are used. Thus, by way of example and not limitation, the dynamic range, D, is D=1000÷50=20. The dynamic range assumed will ordinarily depend on the x-ray spectrum and the contrast or density range of the anatomical field under consideration. The operator will select a value of D.

In the described system as in some other systems, the analog video signals corresponding to the successive x-ray image frames are input to the analog-to-digital converter (ADC) 33. The analog-to-digital conversion process is timed and synchronized with the video camera output by signals on bus 38 which is coupled to main control bus 28. The number of bits to which the analog video signals are digitized may differ for different operating modes. The maximum number of bits obtainable may be limited by the conversion rate of the particular ADC used. By way of example and not limitation, conversion to digital values of 8-bits or even fewer for some modes and 12-bit values and possibly more for other modes can be foreseen. In one actual embodiment of the invention, by way of illustration, the analog video signals are digitized to 8-bit pixel values when the real-time or continuous imaging mode is in effect as in the case when dynamic studies of the chambers of the heart are being made. This lower level digitization or quantitization is satisfactory for real-time difference imaging because there is less x-ray exposure per video frame. 8-bit digitization would provide for 256 quantitization levels.

Further, by way of illustration, in the same actual embodiment of the invention, the analog video signals are digitized to 10-bit pixel values when the snapshot, otherwise called serial imaging, mode is in effect. Digitization to at least 10-bit values is desirable when x-ray exposure and, hence, image frames are produced at a relatively slow rate as is true of the snapshot mode. 10-bit digitization would provide for 1024 brightness level gradations in the displayed image.

Generating subtracted x-ray images every 1/30th of a second as in the real-time mode provides for smooth motion in the display on the television monitor screen as opposed to perceptible time and jerkiness between images presented on the screen. The x-ray source is turned on continuously during the continuous imaging mode. As previously alluded to, in the snapshot or serial imaging, the data for one difference image frame is produced within 1/30th of a second but may be displayed on the screen for the entire time between successive exposures. Then another difference image is produced and the display changes accordingly. The snapshot mode is used most often for situations where anatomical conditions are changing at a slow rate and it is satisfactory to make observations periodically.

Referring to FIG. 1, the digital pixel output signal values from ADC 33 by way of bus 34 become addresses to discrete locations in a memory 35 which serves as a logarithmic transformation device or look-up table (LUT). The memory locations store the logarithms of the digital values corresponding to the addresses so each time a digital pixel value is input by way of bus 34, the logarithm of the pixel value is output on a bus 36. Look-up table storing memory is preferably a random access memory (RAM) whose logarithmic transfer function can be modified according to the number of bits selected from the ADC 33 output. Using a RAM also makes it convenient to insert a look-up table or logarithmic transfer function appropriate for the particular dynamic range, D, which has been chosen. Memory 35 will be called LUT 35 for the sake of brevity.

A selected logarithm look-up table can be loaded into LUT 35 by way of a data bus 37 under software control by the microprocessor or computer which is in system controller 27 and responds to selection made by use of user interface 29. The logarithmic transfer function represented by the look-up table is chosen in accordance with the mode that is in effect. By way of example and not limitation, for the serial or snapshot mode digitization is to 10-bits and for the real-time or continuous mode digitization is to 8-bits and the logarithms, respectively, have the same number of bits.

Programmable read-only memories (PROMS), not shown, could be used to store the logarithmic look-up tables instead of using the RAM but at potentially less flexibility.

The digital logarithm values of the succession of pixel signals composing each x-ray image frame are fed by way of bus 36 to a digital electronic switch that is symbolized by the block marked 39. Switch 39 has two output buses 40 and 41. Bus 40 leads to a full frame memory 42. Typically a frame will be comprised of 512×512 pixels. When operating in either the real-time or serial imaging mode, switch 39 is controlled to send the data or logarithmic pixel values for an x-ray image obtained before the x-ray opaque iodine compound is injected into the bloodstream to the memory 42 where the image data are stored to serve as a mask. A bidirectional bus 43 interconnects memory 42 with a digital processor that is represented by the block marked 44. Digital processor 44 may perform various operations on the pixel values but for present purposes its capability for subtracting pixels for one image from corresponding pixels for another image on a pixel-by-pixel basis only needs to be recognized.

The other bus 41 which leads from switch 39 to processor 44 is designated as the live video signal bus. After storage of mask image data in full frame memory 42 and after the x-ray opaque medium has been injected, switch 39 is switched so it will send the pixel signals for the subsequently obtained x-ray images to the processor 44 where the pixels undergo combination or subtraction with the corresponding pixels for the mask image which are read out of full frame memory 42 and into the processor 44 in phase with the pixel signals on live video bus 41. As each pixel is subtracted a digital difference pixel signal is output from processor 44 on bus 45 which leads to a digital-to-analog converter (DAC) 46 which converts the digital signals to analog video signals that are output on a bus 47 which leads to an analog video disk recorder represented by the block marked 48. Output bus 49 supplies the analog video signals to a television monitor which displays the image resulting from subtraction on its screen 51.

Video disk recorder 48 is a commercially available type which allows video signals to be recorded and stored for a predetermined interval and then sent out over bus 49 for display by monitor 50 and it also allows video signals to be recorded and simultaneously sent out over bus 49 for display. Thus, when the system is being operated in the snapshot mode, the pixels for one postinjection image coming in on bus 41 are combined with the pixels of the mask frame in memory 42 and, after the conversion of the difference digital signals to analog video signals in DAC 46, are recorded on disk and simultaneously displayed. The display of one image in the snapshot mode typically persists for one second by use of the recorded signal and then another x-ray exposure is made and the disk is stepped to a new track and the new video signals are recorded to allow display for the next second. This permits the radiologist to observe a slowly changing condition without the need for irradiating the body for more than once per second. Snapshots can be taken at time intervals above or below one second if desired.

For the snapshot mode, the x-ray beam may be pulsed on for more than a video frame time, that is, for more than one-thirtieth of a second if desired. Usually that will be the case and the x-ray tube current can be set to a sufficiently high level for producing an intense beam that vitiates statistical variations in x-ray photon output such that a high signal-to-noise level results. What is actually done is that an x-ray exposure is made, say for up to 100 ms, during which time the video camera readout is suspended and then the frame is read when the exposure is terminated. Since the x-ray noise is smaller in this case, one has more precision in the data so one must have more precision in the representation of the data which, as will be appreciated later, justifies 10-bit or higher quantitization of the video signals for the snapshot mode.

For the real-time mode a new x-ray exposure and image frame is produced within the video frame time of one-thirtieth of a second. The rapidly produced difference image signals resulting from combining the pixel data for these frames and the mask data can bypass the analog video disk recorder 48 and the resulting difference images can be presented on the video monitor screen at the standard video frame rate. Of course, the successive frames can also be recorded simultaneously on disk by stepping the disk to a new track at the end of each frame. Since x-ray noise is more significant where exposures are short as in the real-time mode the data precision will be reduced and less precision is required in the representation of the data which justifies less than 10-bit, such as 8-bit or even lower quantitization of the video signals for the real-time mode as will be appreciated later.

As has been mentioned, the improvement in digital fluoroscopy systems disclosed herein is to obtain accurate, relatively low noise level and broad bandwidth conversion of digital pixel values to corresponding logarithmic values. In the illustrated preferred embodiment, LUT 35 is one device that is used to achieve these objectives. The processing rate of the system is then limited only by the maximum operating frequencies of the ADC 33 and the LUT 35. Frequencies as large as 20 MHz for 10-bit operation are practical with existing technology. Moreover, other components can be used to achieve what is accomplished with the LUT.

As indicated earlier, the 10-bit or 8-bit digital values from ADC 33 are input addresses to the LUT 35. The output of the enabled LUT is the contents of the memory location which has the address of the input. In this manner, the LUT effectively generates digital values which are a function of the analog input values.

Since in digital fluoroscopy only a fraction of the incoming range of analog signals is of interest, only a fraction of the logarithm signal range is used. Suppose ADC 33 has $M_{max}$ quantization levels and $M_{max}$ and $M_{min}$ are the digital representations of the largest and smallest analog signals of interest. In this case, the dynamic range D is $M_{max}/M_{min}$ which, as indicated earlier, is typically D=20. To make efficient use of the available digital bit levels of the LUT, the smallest available digital value should correspond to the logarithm of $M_{min}$ and the largest to $M_{max}$.

The logarithmic transfer function within the LUT or whatever device or devices are used for transformation takes the form of:

$$N = a \cdot \log M + b \qquad (Eq.\ 1)$$

M and N are typical input and output digital numbers, and "a" and "b" are constants representing, respectively, a scale factor and an offset.

Refer now to the FIG. 2 graph where the abscissa represents the analog video signal values that are output from the video camera 21 but these values correspond to the digitized output values from ADC 33. The ordinates are the logarithms of the abscissa value. The video signal range is assumed to be between 1 mv and 1000 mv for facilitating understanding that results from using real numbers. The plotted curve has a steep slope for low abscissa values and the slope decreases as the values in terms of millivolts increases which is typical of a logarithmic curve. The curve is used to illustrate development, in digital terms of the transformation function of the LUTs. In accordance with Equation 1 and FIG. 2, $N_{max}$ is the digital logarithmic signal output of LUT 1 for the input value $M_{max}$ or the digital equivalent of 1000 mv in the FIG. 2 example. $N_{max}$ will be taken as corresponding to digital 1023.

As can be seen in FIG. 2, over the range of video signal input from 1 to about 50 mv, the slope of the logarithmic curve is very steep which means that for a small change close to the black level where signal is noisiest, there is a large change in the logarithm. Since this part of the signal amplitude is relatively worthless insofar as deriving useful information is concerned, it can be given up with little loss of information. Hence, in this example, the useful range is considered to be between the input signal level M=50 to M=1000. The dynamic range D then is the ratio 1000:50 or 20. Thus, in this example, $M_{max} \div D = 50$.

As indicated earlier, ADC 33 provides, in this example, 10-bit output pixel signals which gives 1024 quantitization levels so in FIG. 2, $M_{max}$ is 1000 and this is to correspond with the highest level output namely, $N_{max}=1023$ digital. When the input digital pixel signal to the LUT is $M_{max}$ the output N should be $N_{max}$ as indicated on the ordinate of the curve in FIG. 2. When the input M=50, the contents of the LUT at address 50 must be $N_{min}=0$ and this is marked on the plot in FIG. 2. Thus, it will be seen in this example that the full range for the output $N_{min}=0$ to $N_{max}=1023$ is to be covered by 10-bits in the LUT locations which, as indicated earlier, is appropriate for operating in the snapshot mode. Now what has been accomplished is to have the logarithm output signals from the LUT correspond only to the video levels which are in the dynamic range of interest. Therefore, the bit depth of the LUT, the memories and other digital devices is minimized.

The general transfer function of the LUT is given by Equation 1. Now it is necessary to calculate the values of the constants "a" and "b" in the equation for getting an exact logarithmic N output from the LUT for any digital address or input value M between 0 and digital 1023. Two equations are required that can be solved for a and b to get the exact transfer function. The following equation applies where $N_{min}=0$:

$$0 = a \cdot \log \frac{M_{max}}{D} + b \qquad \text{(Eq. 2)}$$

The other known condition provides the following equation;

$$N_{max} = a \cdot \log M_{max} + b \qquad \text{(Eq. 3)}$$

Abiding by these equations results in using the number of digital levels available in the PROM or RAM LUT locations in the most efficient manner since they define the useful signal range. Contents of all LUT locations with addresses less than $M_{max}/D$ are filled with zero.

Solving the two preceding equations simultaneously results in:

$$a = \frac{N_{max}}{\log D}$$

$$b = -a \cdot \log \frac{M_{max}}{D}$$

Now the values of a and b can be substituted in Equation 1 and the actual transfer function can be determined for enabling programming of the LUT. In the given example where the input M=50 when the logarithmic N=0 and the input M=1000 when the output N=1000 or about 1023 the following equation results for the snapshot mode:

$$N = 333.81 \cdot \log M - 1305.86 \qquad \text{(Eq. 4)}$$

Now the LUT can be programmed by simply substituting values for M between 50 and 1,000 in the preceding Equation 4 and calculating the logarithmic equivalent or output values N. Thus, every time ADC 33 provides a 10-bit input pixel signal address M to LUT 35, for example, in FIG. 1, a correctly scaled and offset logarithmic N is output on bus 36 for further processing in the system.

The mathematical development given above can, of course, be used to obtain the transfer function for the LUT 35 which is based on using 8 of the 10-bit input to provide from 0 to 255 quantitization levels which were previously indicated to be sufficient for operating in the real-time imaging mode.

In summary, the bandwidth, noise, drift and accuracy limitations that are inherent in converting the analog video signals with a logarithmic amplifier as in the prior art and the speed limitations which are inherent in converting with a computer are obviated by the invention. Moreover, the invention permits making the most efficient use of memory and thereby contributes to reducing the cost of a digital fluoroscopy system.

Although a preferred embodiment of the logarithmic conversion apparatus has been described in detail, such description is intended to be illustrative rather than limiting, for the invention may be variously embodied and is to be limited only by interpretation of the claims which follow.

What is claimed is:

1. A digital fluoroscopy system comprising:
   means including an x-ray source for producing consecutive x-ray images of an anatomical region,
   means including video camera means for converting the image to analog video signals which vary in magnitude in correspondence with variations in brightness of the picture elements (pixels) which compose the image and are within a range defined between black and white,
   analog-to-digital converter means having input and output means, said converter means being operative to convert successive picture element samples of analog video signals fed to its input means to corresponding digital values represented by a predetermined number of bits and appearing on its output means, said digital values constituting digital addresses,
   memory means having address input means and having output means, said memory means having stored in it digital pixel signals representative of the logarithms, respectively, of the digital values in a range whose minimum value is higher by a predetermined amount than the value that corresponds to black and whose maximum value is substantially equal to a value that corresponds to white in the image and in the analog video signal, said digital pixel signals representative of the respective logarithms of the digital values being located in said memory at addresses corresponding to the value so that when a digital pixel value is fed from said analog-to-digital converter means to the memory input means a digital signal corresponding to the logarithm of the values appears on said output means,
   means for processing the logarithmic digital pixel signals including means for subtracting the pixel signals representative of different images and means for converting signals resulting from subtraction to analog video signals, and
   television means responsive to input of the last-named analog signals by displaying a visual image representative of the difference between the x-ray images.

2. The system according to claim 1 wherein said memory means is a programmable read-only memory.

3. The system according to claim 1 wherein said memory means is a random-access memory.

4. The system according to claim 1 wherein the ratio of said maximum value to said minimum value is between about 10 to about 30.

5. The system according to claim 1 wherein the ratio of said maximum value to said minimum value is about 20.

6. The system according to claim 1 wherein said digital pixel signals representative of the logarithms of the digital values are in the range of 8-bit to 10-bit signals to thereby provide for the range of 256 to 1024 brightness levels in the displayed image.

* * * * *